INVENTOR.
MICHAEL I. BEHR
BY
Christie, Parker & Hale
ATTORNEYS

Oct. 27, 1970 M. I. BEHR 3,537,084

DATA STORAGE TIMING SYSTEM WITH MEANS TO COMPENSATE FOR DATA SHIFT

Filed Aug. 14, 1967 2 Sheets-Sheet 2

INVENTOR.
MICHAEL I. BEHR
BY
Christie, Parker & Hale
ATTORNEYS

United States Patent Office 3,537,084

Patented Oct. 27, 1970

3,537,084

DATA STORAGE TIMING SYSTEM WITH MEANS TO COMPENSATE FOR DATA SHIFT

Michael I. Behr, South Pasadena, Calif., assignor to Burroughs Corporation, Detroit, Mich., a corporation of Michigan Filed Aug. 14, 1967, Ser. No. 660,383
Int. Cl. G11b *5/04, 5/44*
U.S. Cl. 340—174.1 15 Claims

ABSTRACT OF THE DISCLOSURE

A timing system for recovery of data from a magnetic data storage file for compensating for the shift of the induced voltage peaks in the reading apparatus caused by high density storage and the distance between the reading head and the magnetic medium. The timing system includes two channels, one channel being provided for the transfer of data when a series of magnetization changes are being read and one data bit thereafter and the other channel being provided for the transfer of data when no changes in direction of magnetization are present and the first data bit of a series of bits represented by a series of changes in direction of magnetization, with the data being delayed in the second channel by an amount related to the shift anticipated for the data bits.

BACKGROUND OF THE INVENTION

Field of the invention

This invention relates in general to timing systems and, more particularly, to a system for timing the recovery of data from a magnetic data storage file. This invention fiinds application in the field of information storage and retrieval equipment and, more particularly, finds application in the field of equipment arranged for digital information which is to be stored and recovered from magnetic memory stores. In one particular nonlimiting embodiment of this invention, the memory store is a disk file system.

DESCRIPTION OF THE PRIOR ART

In memory stores such as tapes, drums or disk files, information in the form of magnetically recorded impulses are stored on the tape surface, drum surface or disk surface which is coated with a film of magnetic material. Each impulse so stored is termed a "bit" of information, and many of these bits are continuously recorded in information tracks. Any store such as a magnetic disk file will have numerous tracks of information. The magnetic disk file is more fully described in an application Ser. No. 649,752, filed Mar. 13, 1967, entitled Information Address Recording and Retrieval System, now U.S. Pat. No. 3,375,507, issued Mar. 26, 1968 to Ralph Gleim et al. and assigned to the same assignee as the present application.

In the referenced application, magnetic disks, each having three separate data or information zones, are described. Data in the form of binary bits, is stored in each information zone. Each information zone has a frequency different from the other zones so as to allow more efficient data handling. In accordance with the technique described in the referenced application, a clock track is also provided on the disk for each information zone. The clock data takes the form of repetitive binary bits having the same predetermined frequency of repetition as the information data in the associated information zone and having the same length of bit period. Thus, each clock track has a bit period which is suitable for clocking data relative to its own associated information zone.

The data storage in magnetic storage systems is often accomplished by employing a version of the nonreturn-to-zero (NRZ) method of recording. This and other methods of recording on magnetic surfaces are generally described in Digital Computer Components and Circuits, R. K. Richards, published by de Van Nostrand Company, Inc., at pages 314–350. Taking the NRZ method of recording as an example, a binary "1" appearing after a binary "0" is represented by a change in the magnetization in one direction, a binay "0" appearing after a binary "1" is represented by a change in magnetization in the opposite direction, and a succession of "1's" and "0's" after the first in a series is represented by magnetization in the same direction with no change. In a similar fashion for the modified NRZ method of recording, a plurality of successive "1's" is represented by a plurality of changes in direction of magnetization with the binary "0" being represented by no change in direction of magnetization.

When there are a number of successive changes in direction of magnetization, the first and last change, even though occurring at the proper time during writing of the data, will upon recovery respectively result in an early-occurring data bit and a late-occurring data bit. When recovering the recorded data, the first change in a series will appear as a peak, which is shifted early relative to the clock bit period in which the binary bit was recorded. Similarly, when recovering the data, the last change in a series of magnetization changes will appear as a peak shifted late relative to the clock bit period in which the binary bit was recorded. The peaks between changes developed during recovery will not be shifted but will appear in their true position relative to the clock bit period in which the binary bits were recorded. The relative shift is a result of the different directions of magnetization inducing voltages with opposite polarities in the coils of the read head and the algebraic summation of the first polarity with the second in a series, and the last with the next to last in a series.

The shift is even more pronounced in high density systems. It is common practice to press the limits of the state of the art in packing densities for data bits on magnetic storage media. Because of this the shift can easily be great enough to cause a false reading or loss of a bit. There are no systems known to the applicant that in any way compensate for this shifting of the binary data bits upon recovery of data recorded by employing the modified NRZ method of recording or for the shifting of the peaks at the beginning and the end of a series of magnetic field changes in other methods of recording.

SUMMARY OF THE INVENTION

As the packing density is increased in magnetic data storage systems, the degree of shifting of the first and last pulse in a series of changes in the direction of magnetization also increases. The shift may be as much as 33% of a bit cell. When the first and last bit in a series of bits represented by a succession of changes in direction of magnetization are shifted to any degree, a bit may be lost in the recovery or a bit may be inserted because of the reading of noise near the beginning or end of a bit period. In recovering the stored information that has been stored by the modified nonreturn-to-zero method which is described beginning at page 330 in the above-identified reference, if a "1" is being read, then the next bit will appear either in its true position or late. That is, the next bit will either be a binary "0" coresponding to no change in direction of magnetization or it will be a binary "1" corresponding to a change in the direction of magnetization and if this "1" is at the end of a series of "1's," then the data bit will be shifted late. Similarly, if a binary "0" is being read, then it is known that the next data bit will be either in its true position, if it is another "0" or a single binary "1" appearing between two binary "0's," or the data bit will be shifted early if it is a binary "1" at the beginning of a series of "1's.".

The shifting of binary bits is compensated for in accordance with the present invention by employing a timing system wherein, after the first change in a series of changes, the series of binary bits corresponding to a series of changes in direction of magnetization on the magnetic storage medium and the late bit corresponding to the last magnetization change in a series are strobed by a clock that is delayed a selected fraction of the anticipated shift of the shifted data bits. The same clock is used to strobe a series of binary bits corresponding to no change in the direction of magnetization on the magnetic storage medium and the early data bit corresponding to the first magnetization change in a series of successive changes. However, to compensate for the binary data bits that are shifted early, the recovered data is delayed by the anticipated degree of shift so that the early data bits will be more nearly in their true position. Thus, the true position data bits are strobed with a clock that occures slightly beyond the optimum midpoint of the bit, and the late data bits and the early data bits are strobed with a clock that appears at the optimum midpoint of the binary bit.

The timing system for recovery of data where the modified NRZ method of recording is employed includes two channels, one channel having the recovered data applied without any delay and the other channel having the recovered data applied with a delay equal to the anticipated shift of the recovered binary bits. The output of the two channels is applied to a gating network that produces an output pulse for the binary "1's" and no output pulse for the binary "0's." The timing system further includes a means responsive to the output of the gating means for sensing the presence of binary "1's" with means resopnsive to the sensing means for selecting the first channel for the passage of data bits when a plurality of binary "1's" appear at the output of the gating means and for selecting the second channel for the transfer of the recovered data when a plurality of binary "0's" appears at the output of the gating means.

DESCRIPTION OF THE DRAWING

The above and other features and advantages of the present invention may be understood more clearly and fully upon consideration of the following specification and the accompanying drawing in which.

DESCRIPTION OF THE PREFERRED EMBODIMENT

In one embodiment of this invention the data is stored on the magnetic storage medium by employing the above-described modified nonreturn-to-zero method of recording, although the invention is in no way limited to that method of recording. It is generally applicable to any method where there are a series of changes in directions of magnetization or magnetic orientation on the surface of the magnetic storage medium and where there is a resultant shift in the recovered binary bits corresponding to the first and last change in direction of magnetization in a series of changes.

In the modified NRZ method of recording on a magnetic medium, such as tape or disk files, a binary "1" is represented by a change in the direction of magnetization.

For purposes of illustration, it is assumed that the stored data has the pattern of 1, 1, 1, 1, 0, 0, 0, 1, 1, 1, 0, 0, 1, 1, 0. The writing current used in storing this pattern is set forth as curve W in FIG. 1.

Figure 1:
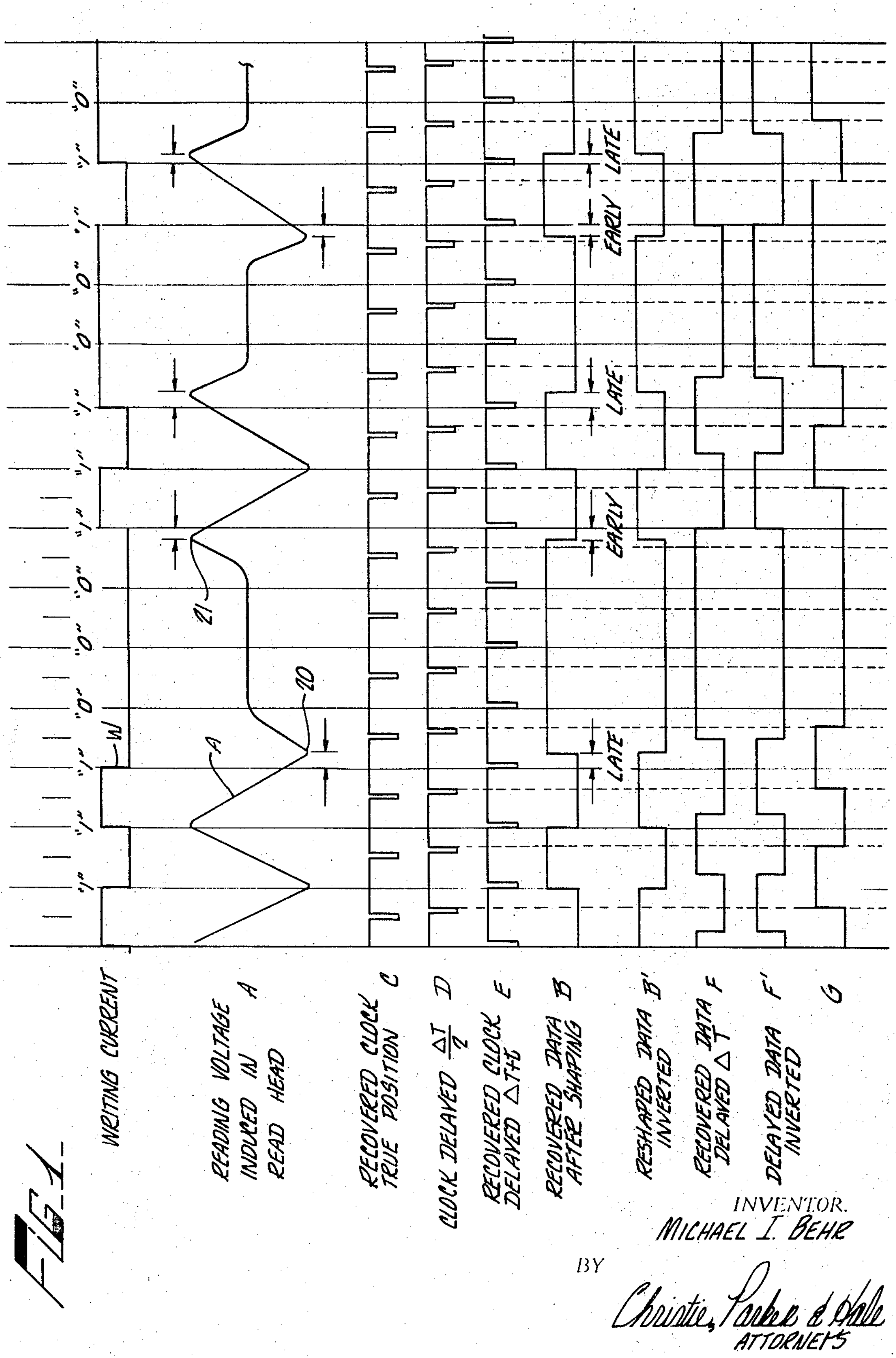
FIGS. 1 and 1A, taken together, depict a timing chart showing the curves for modified NRZ recording, and the curves that exist in the apparatus of the present invention for compensating for the shift of the binary bits upon recovery, which timing chart is useful in promoting a clearer understanding of the operation of the circuitry in the apparatus.
Figure 1A:
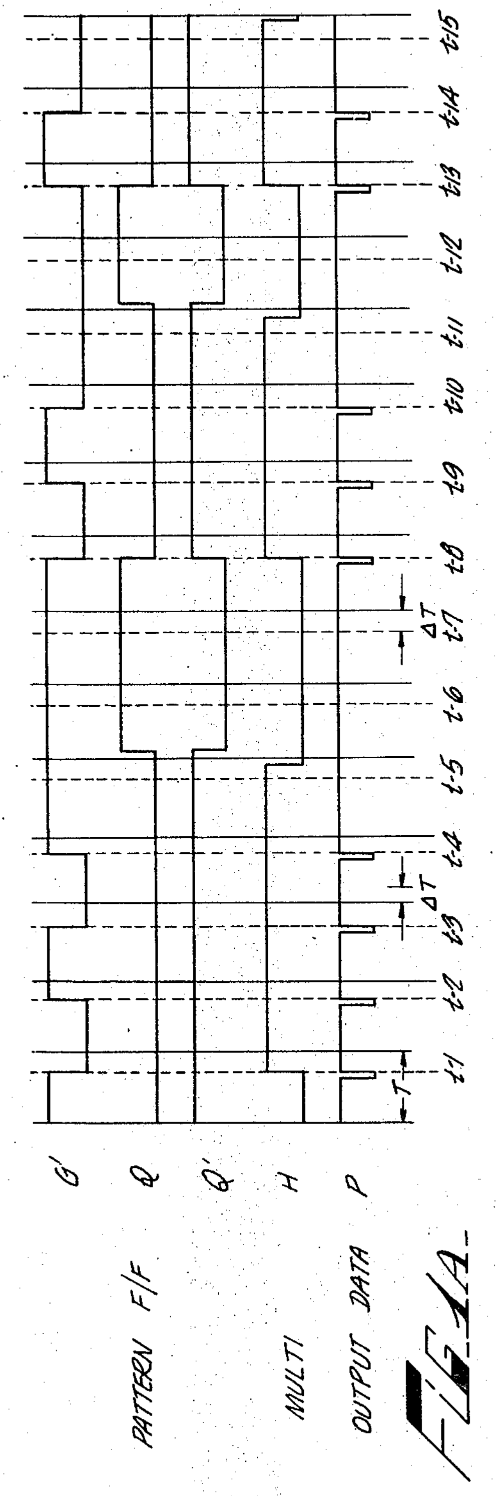

Upon recovery of the stored information a voltage is induced in the read heads which voltage varies in polarity and magnitude as shown in curve A of FIG. 1. It is seen from curve A that the voltage peak representing the last binary "1" of a plurality of "1's," appears late with respect to its true position as determined by the assigned bit period as shown by peak 20 on curve A. Similarly, it is seen from curve A that the first binary "1" of a plurality of binary "1's" is shifted early as shown by peak 21 of curve A.

The induced voltage at the reading heads is converted to binary information as shown by curve B in FIG. 1. The shifting of the voltage peaks is carried over into the binary information with a resultant shift of the data bits, either late or early, depending upon their position with respect to a succession of binary "1's."

In one nonlimiting embodiment of this invention the storage medium upon which the information is recorded and is being recovered, is a magnetic disk file, although the invention is in no way limited to this type of storage medium as it is equally applicable to magnetic drums or magnetic tapes. However, a magnetic disk file will be employed in describing the invention.

Figure 2:
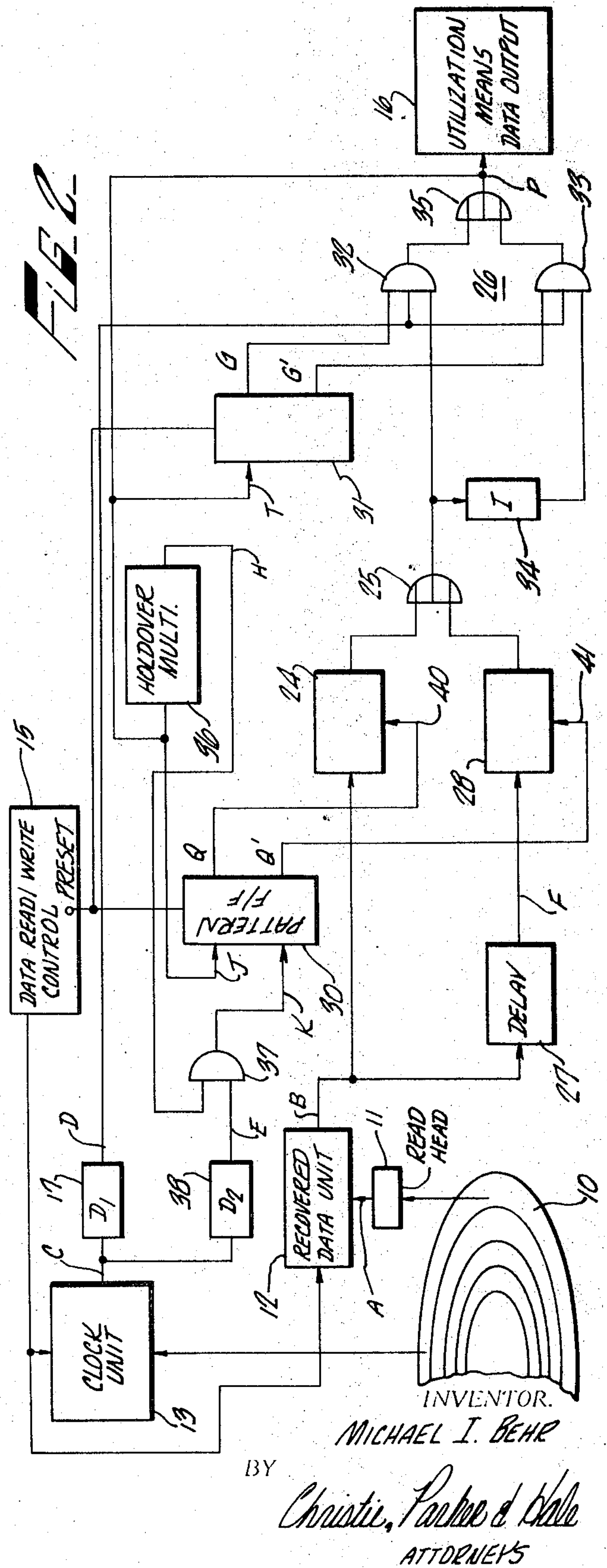
FIG. 2 is a block and logic diagram of the circuitry for compensating for the shift of data bits in accordance with the present invention.

Such a disk file 10 is shown schematically in FIG. 2. The information is being recovered from the selected information track by read head 11 and is applied to recovered data unit 12 for shaping and conversion to digital data. Associated with the information track is a clock track which is being read by clock unit 13. The information track from which the data is recovered is selected by the data read/write control 15 and the recovery of the information is accomplished under the control of the data read/write control 15. The recovered data, after being shaped in the recovered data unit 12, appears at point B and is represented by curve B in FIG. 1.

The information stored in the clock track is in the form of repetitive binary bits having the same predetermined frequency of repetition as the information data and the same bit cell or bit period as the information bits. The recovered information from the clock track therefore takes the form of repetitive binary bits as shown in curve C of FIG. 1. This series of binary bits appears at point C at the output of clock unit 13 shown in FIG. 2.

As seen from the recovered information which appears at point B, which is curve B in FIG. 1, the last binary "1" of the series of "1's" is shifted late with respect to its bit cell by a period $\Delta T$. Similarly, the first binary "1" in a series of "1's" is shifted early $\Delta T$, where T is the bit period.

The degree of shift will be dependent upon the packing density of the bits on the magnetic medium and the parameters of the read head and the positioning of the read head. For purposes of illustration, it is assumed that the maximum anticipated shift $\Delta T$ of the binary bits is approximately one-fourth of a bit period which represents a 25% error or shift of the binary bits.

It is desirable to strobe the binary bits in the middle of the bit thereby providing the widest margin to avoid spurious noises and false readings. However, when the binary bit is shifted either early or late, the clock pulse set to strobe at the bit cell midpoint does not appear in the middle of the bit. Thus, to compensate for the late shift in the binary bit, the clock pulse is delayed one-half $\Delta T$ to accomplish strobing in the middle of the bit. However, this shift of the clock alone does not compensate for the early data bit. In the modified NRZ method of recording it is known that when a plurality of "0's" are being read the next binary bit will be either in a true position or shifted to the left or early so that the clock pulse for strobing should either be in the true position or early by one-half of $\Delta T$. It is possible to delay the clock pulse, but it is not possible to anticipate an early data bit for advancing the clock pulse at the proper time for compensation. Thus, the early data bits are compensated for in accordance with the present invention by delaying the recovered data by ΔT so that a clock pulse delayed by one-half ΔT strobes the early data bit in the middle at the optimum point.

The circuitry of the bit shifting compensating apparatus of the present invention is shown in logic and block form in FIG. 2 in conjunction with the magnetic disk file 10 on which the information to be recovered is recorded, which recovery is controlled by the data read/write control unit 15. The recovered information is transferred through the compensating network to the utilization means 16.

The recovered clock pulse represented by curve C in FIG. 1, which appears at point C in FIG. 2 at the output of clock unit 13, is delayed by delay unit 17 by a period equal to one-half of ΔT. This clock pulse, which is represented by curve D in FIG. 1, appears at point D and is employed as the strobe pulse for the transfer of the recovered data through the compensating circuitry. This delayed clock pulse will strobe any data bit which is in its true location at a point slightly beyond the optimum midpoint. Additionally, the delayed clock pulse will strobe the late data bits at the optimum midpoint. For the proper strobing of early data bits in accordance with the present invention, the recovered data is delayed by a period equal to the anticipated shift of the data bits and thereafter the delayed clock pulse also strobes the early data bits at the optimum midpoint.

The compensating network includes two channels for the passage of the recovered data. One channel is from point B through a data transmission or control gate 24 to OR gate 25 to the input of gating network 26. The other channel is from point B through delay unit 27 and a data transmission or control gate 28 to the OR gate 25 at the input to the gating network 26. The recovered data is transferred to the utilization means 16 through either control gate 24 or control gate 28 under the control of pattern flip-flop 30 which is responsive to the output of the gating network 26 for sensing the presence of binary "0's" or binary "1's."

Prior to the appearance of any recovered data, the compensating network is pre-set by the application of a pulse from the data read/write control 15. This pulse, which may be derived from a unique bit recorded on the magnetic storage medium as described in the concurrently filed application Ser. No. 660,484 by Messrs. Anderson, Jorgenson and Vigil entitled Data Storage Timing System, and assigned to the same assignee as the present application, occurs at the beginning of the record that is being recovered and presets the pattern flip-flop 30 and trigger flip-flop 31. In the preset condition flip-flops 30 and 31 have a true signal on the output terminals Q and G, respectively. Pattern flip-flop 30 is a JK flip-flop or complementary flip-flop having input terminals J and K. The characteristics of this type of flip-flop and the truth table for the operation of this flip-flop are described in the last referred to concurrently filed application. Flip-flop 31 is a trigger flip-flop which has the characteristic wherein the condition of the flip-flop changes for every true signal that is applied to terminal T.

With flip-flops 30 and 31 preset to their true condition and assuming a succession of binary ones as recovered data, as shown in FIG. 1, the control gate 24 will be satisfied and the information will pass through the first channel including control gate 24. Data transmission gates or control gates 24 and 28 are identical elements which have the characteristic of passing all information on the input terminal when the control terminal, which is the terminal shown on the bottom of the element in FIG. 2, has a true signal applied thereto.

The output of control gate 24 is applied to the gating network 26 through the OR gate 25. The gating network 26 includes AND gates 32 and 33 and an inverter 34. The output of the inverter 34 is the inverse or the complement of the signal that appears at the output of OR gate 25. The gating network further includes an OR gate 35 at its output.

Pre-setting pattern flip-flop 30 to a true condition applies a true signal to the control input lead 40 of control gate 24 and a false signal to the control terminal 41 of control gate 28. Thus control gate 28 is inhibited while the control gate 24 is operative so that the recovered data passes through control gate 24. The output of control gate 24 passes through OR gate 25 to the inputs of AND gate 32. The complement of the digital data that passes through OR gate 25 is applied to AND gate 33 through inverter 34. AND gate 32 initially has a true signal applied at the input terminal connected to the G output terminal of trigger flip-flop 31. The G′ output terminal of trigger flip-flop 31 has a false signal which is applied to AND gate 33 so that this gate is inhibited. Therefore, the signal will pass through AND gate 32 when the clock pulse is applied from the output of delay unit 17. Thus, it is seen by referring to the curves in FIG. 1 that curve B will be transferred through control gate 24 to one of the input terminals of AND gate 32. Initially, the recovered data is true and upon the appearance of the first clock pulse at time *t1* this true signal will be transferred through AND gate 32 and will appear at the output point P as a binary "1."

The output signal appearing at point P is coupled to the J terminal of pattern flip-flop 30. However, since the pattern flip-flop 30 was preset in the true condition, its condition does not change. The signal appearing at the output point P is also applied to a hold-over multivibrator 36 which is triggered by the output pulse and has a false output at point H for a period of time slightly greater than a bit period. This false signal appearing at point H is applied through AND gate 37 to the K input terminal of pattern flip-flop 30. The output of multivibrator 36 is gated through AND gate 37 by a clock signal that is the recovered clock pulse delayed by an amount sufficient to permit the multivibrator 36 to time-out. This delay is caused by delay element 38 which is positioned between point C where the recovered clock pulse train appears and the other input terminal of AND gate 37.

The output signal appearing at point P is applied to input terminal T of trigger flip-flop 31 and causes this flip-flop to change states. Upon a change of states a false signal appears at terminal G and a true signal appears at terminal G′. Thus, the AND gate 32 is inhibited and AND gate 33 has one condition satisfied.

The recovered data signal represented by curve B is applied through control gate 24 to the input of the inverter 34 so that the complement represented by curve B′ in FIG. 1 is applied to one of the input terminals of AND gate 33. It is seen from curve B′ that during the second bit period and at time *t2* when the second clock pulse at the output of delay unit 17 occurs, the inverted data bit is true so that the condition of AND gate 33 is satisfied and produces an output pulse at point P. This pulse is applied to flip-flop 31 and causes the flip-flop 31 to change states so that the next pulse will be transferred through AND gate 32.

In the illustrative example, the fourth data bit is a binary "1" at the end of a succession of binary "1's" and is shifted late. This binary bit and the following binary "0" is transferred thhrough control gate 24 to the output.

At the occurrence of the clock pulse at time *t5* AND gate 33 is inhibited with the false signal being applied at the point G′ while one of the conditions at AND gate 32 is satisfied. However, at time *t5* the recovered data is false so no output pulse is generated and trigger flip-flop 31 remains in its previous state. This flip-flop remains in its previous state until the next output pulse appears at point P which is seen to be at time *t8* in FIG. 1. With the absence of an output pulse at time *t5* multivibrator 36 times out and changes states so that a true signal is applied to AND gate 37. This true signal is transferred through AND gate 37 by the next clock pulse at the output of delay unit 38. At this time a true signal is applied to the K input terminal of the pattern flip-flop 30 and changes the state of this flip-flop. By changing the state of this flip-flop the true signal is removed from control gate 24 so that this gate is inhibited and a true signal is applied to control gate 28 to activate this gate. Thereafter, the recovered data, after delay which is curve F in FIG. 1 which appears at point F in FIG. 2, is transferred through control gate 28 to the gating network 26.

Therefore, it is seen that a binary "0" is sensed by the hold-over multivibrator 36 and pattern flip-flop 30 to inhibit the path or channel through control gate 24 and to activate the path through control gate 28 so that the delayed recovered data is thereafter employed in passing any output pulses.

When a binary "0" is present at point P at the output of gating network 26, it is known that the next binary bit will be either at the true position, i.e., a single binary "1" or another "0," or shifted to the left as an early data bit. Therefore, to compensate for the possibility of an early data bit, the recovered data is delayed a period equal to the anticipated shift of the data bit via delay network 27 and passed through control gate 28.

Control gate 28 remains activated until the next output pulse is generated at point P which output pulse is applied to the J terminal of pattern flip-flop 30 to change the state of this flip-flop. The output pulse is generated by a binary "1" that occurs either early or on time in the bit period. However, if the "1" occurs early the early occurrence is compensated for because the delayed recovered data train is being transferred through the timing system and this delayed recovered data is strobed at the optimum midpoint by the delayed clock pulse at the output of delay network 17.

Thus, if the binary bit being transferred through transmision gate or control gate 28 is a "1," whether in its true position or early, then the next binary bit will be transferred through control gate 24 of the timing system. This next bit will either be in its true position, if it is another "1" or a "0," or it will be late, if it is the last "1" in a series of "1's." If this next bit is a "1" then the data will continue to be transferred through control gate 24 in anticipation of the late data bit. However, if this next bit is a "0" then the following data bits will be delayed and transferred through the control gate 28 in anticipation of an early data bit. However, if an uncrowded "1" appears first, the data will be transferred through control gate 24 for one "0" binary bit and thereafter delayed and transferred through gate 28 in anticipation of the next early data bit.

An alternative embodiment to the employment of the hold-over multivibrator 36 and the use of the delay network 38 and gate 37 is to employ an Exclusive OR gate having two AND gates with the outputs connected together. One AND gate is responsive to the conditions on terminal G and the output of the inverter 34 and the clock pulse at the output of delay network 17 while the other AND gate of the Exclusive OR gate is responsive to the signal at terminal G′ and the output of OR gate 25 and the clock pulse at the output of delay network 17. The output of this Exclusive OR gate is connected to the K input terminal of pattern flip-flop 30 to change the state of this flip-flop to activate control gate 28 at the appropriate time.

Thus, in accordance with the present invention, shifts in the induced voltage peaks upon recovery of the recorded data are compensated for by employing the method of passing the data through a first gate until a binary bit corresponding to no change in direction of magnetization on the magnetic storage medium occurs, sensing this binary bit that corresponds to no change in direction of magnetization, and in response to the sensing of the binary bit and inhibiting the first transmission gate and activating a second transmission gate for passing the recovered data after it is delayed a selected interval.

The method further includes the steps of transferring the delayed data through the second transmission gate until a binary bit corresponding to a change in direction of magnetization on the magnetic storage medium occurs, monitoring the output of the second transmission gate, sensing a binary bit corresponding to a change in direction of magnetization on the magnetic storage medium and inhibiting the second transmission gate and activating the first transmission gate in response to the occurrence of the data bit at the output of the second transmission gate corresponding to a change in the direction of magnetization, and thereafter repeating the above sequence of steps until the selected record is recovered.

Various changes may be made in the details of construction without departing from the spirit and scope of the invention as defined by the appended claims.

What is claimed is:

1. A timing system for clocking digital data recovered from a magnetic storage medium having an information track with information stored therein as bits of binary data having a predetermined bit period comprising:

means for sensing a succession of binary bits corresponding to a succession of changes in direction of the magnetization on the magnetic medium and for sensing a succession of binary bits corresponding to no changes in direction of magnetization on said magnetic medium;

a first channel for transferring the recovered binary data;

a second channel for transferring the recovered binary data, said second channel including means for delaying the binary data a selected period of time;

means responsive to the sensing means for selecting the first or the second channel for transferring the binary data.

2. In a magnetic information storage and retrieval system having a means for utilizing stored information, a storage medium having an information track with information stored therein as bits of binary data having a predetermined bit period;

means for receovering the data from the information track wherein the first and last bits of binary data represented by a succession of changes in direction of magnetization on the storage medium are shifted respectively early and late with respect to the predetermined bit period and means for emitting a series of gate enabling clock pulses, at least one pulse for each bit period;

a timing system comprising:

a first channel for transferring bits of binary data having a pattern formed by a plurality of changes in direction of magnetization on the magnetic medium and the first bit of binary data following this pattern and for transferring the first binary bit following a binary bit representing a single change in direction of magnetization;

a second channel for transferring bits of binary data having a pattern formed by no changes in direction of magnetization and the first bit following this pattern and for transferring the single binary bit corresponding to a change in direction of magnetization on the storage medium preceded and followed by no change in direction of magnetization;

means for sensing the pattern of binary bits formed by the succession of changes in direction of magnetization for selecting the first channel and inhibiting the second channel; and means for sensing the pattern of bits of binary data representing a succession of no changes in direction of magnetization for selecting the second channel and inhibiting the first channel.

3. A timing system in accordance with claim 2 including means for strobing the transfer of binary data, said strobing means including a delay network for delaying the clock pulse train from said emitting means a period equal to one-half the period of shift of the shifted binary bits.

4. In a magnetic information storage and retrieval system having a means for utilizing stored information; a storage medium having an information track with information stored therein as bits of binary data having a predetermined bit period; means for emitting a series of gate enabling clock pulses, at least one for each bit period; and means for recovering the information from the information track wherein the first and last bits of binary data represented by a succession of changes in direction of magnetization on the storage medium are shifted respectively early and late with respect to the predetermined bit period;

a timing system comprising:

a first channel having an input of receovered digital data, said first channel including a first control gate;

a second channel having an input of receovered digital data, said second channel including a second control gate and a delay network for delaying the recovered digital data by an amount equal to the anticipated shift of the shifted binary bits, each control gate having a control terminal, the control terminal of the first control gate having an input that is the inverse of the input on the control terminal of said second control gate;

a gating network having two paths, the first path including a first three input AND gate, the second path including an inverter and a second three input AND gate, said first AND gate having an input signal on one input terminal that is the inverse of the signal applied to one input terminal of the second AND gate so that only one path at a time is operative;

the output of the gating network being applied to the utilization means;

a first means responsive to the output of the gating means for controlling the operation of said first and second AND gates;

a second means responsive to the output of said gating network for controlling the operation of said first and second control gates;

and means for delaying the clock pulse train from said emitting means one-half of the period in which the shifted data bit is shifted for clocking the transfer of the binary data through said first and second AND gates.

5. A timing system in accordance with claim 4 wherein the second responsive means is a complementary flip-flop having two input terminals with one input terminal connected to the output of the gating network and the other input terminal connected through a holdover multivibrator to the output of the gating network through a third AND gate;

a second means for delaying the clock pulse train for a period longer than the shift period of the shifted binary bit; and means for applying the delayed clock pulse train from the second delay means to the third AND gate for clocking the output of the holdover multivibrator to the second input terminal of the complementary flip-flop.

6. In a data recording and recovery system for serial binary data having data bits of a first binary state represented by a change from one signal level to another signal level in successive bit cell positions and data bits of a second binary state represented by no change in signal level in successive bit cell positions, the system comprising:

a magnetic storage medium having assigned thereto a series alignment of magnetic areas capable of assuming opposite directions of flux orientation for successive bits of said one binary state and an absence of any change in flux orientation for bits of said second binary state;

means for storing a group of serial bits of binary data on said alignment of magnetic areas in a random pattern of first or second binary states according to the information content of the bit group;

a magnetic head means for recovering said stored bits from said magnetic medium, said head means characterized by its ability to reproduce a signal from each flux orientation area indicative of said one binary state, a waveform substantially centered in its associated bit cell position except in instances wherein at least two adjacent bits of said one binary state are both preceded by and followed by at least one bit of said second binary state wherein the first flux orientation representative of said at least two bits of said one binary state induces a first waveform in said head means which is displaced a predetermined maximum amount later than its bit cell position and the last flux orientation induces a second waveform which is displaced a predetermined maximum amount later than its bit cell position;

a first and second transmission gating means each normally set in a data blocking state and capable of controllably assuming, a data transmission state, said first gating means being connected to said magnetic head means and said second gating means being connected to said delay means;

means for emitting a series of gate-enabling clock pulses one each for each bit cell position and all being delayed approximately one-half of said maximum displacement amount relative to mid-bit cell positions for all bit cells; and means sensing recovery of a bit of said second binary state following at least one bit of said first binary state and responsive thereto for selectively applying said gate-enabling pulses to said second gating means.

7. A system in accordance with claim 6, including means sensing recovery of a bit of said first binary state following at least one bit of said second binary state and responsive thereto for selectively applying said gate-enabling pulses to said first gating means.

8. In a magnetic information storage and retrieval system having a means for utilizing stored information, a storage medium having an information track with information stored therein as bits of binary data having a predetermined bit period, means for recovering the data from the information track wherein the first and last bits of binary data represented by a succession of changes in direction of magnetization on the storage medium are shifted respectively early and late with respect to the predetermined bit period, and means for emitting a series of gate-enabling clock pulses, at least one pulse for each bit period; a timing system comprising a first and second transmission gating means, each normally set in a data-blocking state and capable of controllably assuming a data transmission state; means for delaying the recovered data a predetermined amount; means for connecting the output of the delaying means to said second transmission gate; means for applying the recovered data to the delaying means and the first transmission gating means; first means connected to the output of the first and second gating means sensing passage through the gating means of a data bit corresponding to a change in direction of magnetization on the magnetic storage medium following at least one bit period having no change in direction of magnetization and responsive thereto for selectively applying said gate-enabling pulses to the first transmission gating means, and second means connected to the output of said first and second transmission gating means sensing passage of a bit corresponding to no change in direction of magnetization on the magnetic storage medium following at least one change in direction of magnetization and responsive thereto for selectively applying said gate-enabling pulses to said second transmission gating means.

9. A method for compensating for the shift of binary data upon recovery in a magnetic information storage and retrieval system having a means for utilizing stored information, a storage medium having assigned thereto a series alignment of magnetic areas capable of assuming opposite directions of flux orientation for representing data bits in binary states having a predetermined bit period, means for recovering the data from the storage medium wherein the first and last bits of binary data represented by a succession of changes in direction of magnetization on the storage medium are shifted respectively early and late with respect to the predetermined bit period, and means for emitting a series of gate-enabling clock pulses, at least one pulse occurring in each bit period, comprising the steps of transferring the recovered data to the utilization means through a first data transmission gate until a first binary bit corresponding to no change in direction of magnetization ocuurs in the sequence of recovered binary bits, sensing at the output of the first transmission gate each binary bit corresponding to no change in direction of magnetization occurs in the first transmission gate and activating a second transmission gate in response to the sensing of the binary bit corresponding to no change in the direction of magnetizaton following binary bits corresponding to changes in direction of magnetization, delaying the recovered data at the input to the second transmission gate, transferring the delayed data through the second transmission gate until a binary bit corresponding to a change in direction of magnetization occurs in the sequence of data bits being transferred through the second transmission gate, sensing at the output of the second transmission gate the first data bit corresponding to a change in direction of magnetization following data bits corresponding to no change in direction of magnetization, inhibiting the second gate and activating the first gate for transferring the data through the first transmission gate in response to the sensing at the output of the second transmission gate the first binary bit corresponding to a change in direction of magnetization following binary bits corresponding to no change in direction of magnetization, and repeating the above steps until all the data of the selected record is transferred to the utilization means.

10. In a magnetic information storage and retrieval system having means for utilizing stored information, a storage medium having an information track with information stored therein as bits of binary data having a predetermined bit cell;

means for recovering the data from the information track wherein the first and last bits of binary data represented by a succession of changes in direction of magnetization on the storage medium are shifted respectively early and late with respect to the predetermined bit cell, and means for emitting a series of clock pulses with at least one pulse within each bit cell;

a timing system comprising:

a first channel for transferring bits of binary data having a pattern formed by a plurality of changes in direction of magnetization on the storage medium and the first bit of binary data following this pattern and for transferring the first binary bit following a binary bit representing a single change in direction of magnetization;

a second channel for transferring bits of binary data having a pattern formed by no changes in direction of magnetization and the first bit following this pattern and for transferring a single binary bit corresponding to a change in direction of magnetization on the storage medium preceded and followed by no change in direction of magnetization;

means for sensing each binary bit formed by a change in direction of magnetization for selecting the first channel and inhibiting the second channel and for sensing said binary bit representing no change in direction of magnetization for selecting the second channel and inhibiting the first channel.

11. A timing system in accordance with claim 10 further comprising a delay means in said second channel for delaying the binary data transferred through said second channel a selected interval of time.

12. A timing system in accordance with claim 11 further comprising means for strobing the transfer of binary data, said strobing means including a delay circuit for delaying the series of clock pulses an interval of time related to the anticipated shift of the binary bits that shift.

13. A timing system for clocking digital data recovered from a magnetic storage medium having an information track with information stored therein as bits of binary data within a predetermined bit cell comprising:

means for distinguishing between binary bits formed by a change in direction of magnetization and binary bits representing no change in direction of magnetization;

a first channel for transferring the recovered binary data;

a second channel for transferring the recovered binary data, said second channel including means for delaying the binary data a selected interval of time;

means responsive to the distinguishing means for selecting the first or the second channel for transferring the binary data.

14. A timing system for partially compensating for shift of data bits upon recovery from their position in time relative to an assigned bit cell, said data bits being either of a first binary state represented by a change from one signal level to another signal level in successive bit cell positions, or a second binary state represented by no change in signal level in successive bit cell positions, said timing system comprising means for distinguishing recovered data bits of the first state from recovered data bits of the second state, and means responsive to the distinguishing means for shifting the position of the recovered data bits relative to their assigned bit cells.

15. In a data storage and retrieval system where some recovered data bits have a position such that the data bit appears early with respect to its true position established during recording, and where some recovered data bits have a position such that the data bit appears late with respect to its true position established during recording, a timing system comprising means for recovering the data bits, means for recovering clock pulses, means for shifting the early data bits relative to their true position, and means for shifting the late data bits relative to their true position to more closely synchronize the recovered clock pulses and the recovered data bits.

References Cited

UNITED STATES PATENTS

| | | | |
|---|---|---|---|
| 2,972,735 | 2/1961 | Fuller et al. | 340—174.1 |
| 3,067,422 | 12/1962 | Hunt | 340—174.1 |
| 3,243,580 | 3/1966 | Welsh | 340—174.1 |
| 3,271,750 | 9/1966 | Padalino | 340—174.1 |
| 3,223,115 | 5/1967 | Sims | 340—174.1 |
| 3,405,391 | 10/1968 | Halfhill et al. | 340—174.1 |

JAMES W. MOFFITT, Primary Examiner

V. P. CANNEY, Assistant Examiner

U.S. Cl. X.R.

346—74

PO-1050
(5/69)

UNITED STATES PATENT OFFICE
CERTIFICATE OF CORRECTION

Patent No. 3,537,084 Dated October 27, 1970

Inventor(s) M. I. Behr

It is certified that error appears in the above-identified patent and that said Letters Patent are hereby corrected as shown below:

Column 1, line 35, "fiinds" should read --finds--. Column 2, line 48, after "recording" insert --or the NRZ method of recording--. Column 3, line 37, "resopnsive" should read --responsive--. Column 6, line 64, "thhrough" should read --through--. Column 7, line 29, after "flip-flop" delete "The" and insert --This--; line 75, after "bit" delete "and". Column 8, line 43, "receovering" should read --recovering--.

Column 9, line 21, "receovered" should read --recovered--; line 24, "receovered" should read --recovered--. Column 10, line 25, after "amount" delete "later" and insert --earlier--; between lines 28 and 29 insert --means connected to said magnetic head means for delaying each bit of said bit group an amount related to said maximum displacement amount;--.

Column 11, line 23, "ocuurs" should read --occurs--; line 26, after "magnetization" delete "occurs in" and insert --inhibiting--. Column12, line 4, "select-" should read --selecting--.

Signed and sealed this 10th day of August 1971.

(SEAL)
Attest:

EDWARD M.FLETCHER,JR.
Attesting Officer

WILLIAM E. SCHUYLER, JR.
Commissioner of Patents